April 30, 1963 J. R. FOSTER 3,087,323
MORTISE-TYPE, REVERSE-PIVOTED LATCH MECHANISM
Filed March 7, 1960 8 Sheets-Sheet 1
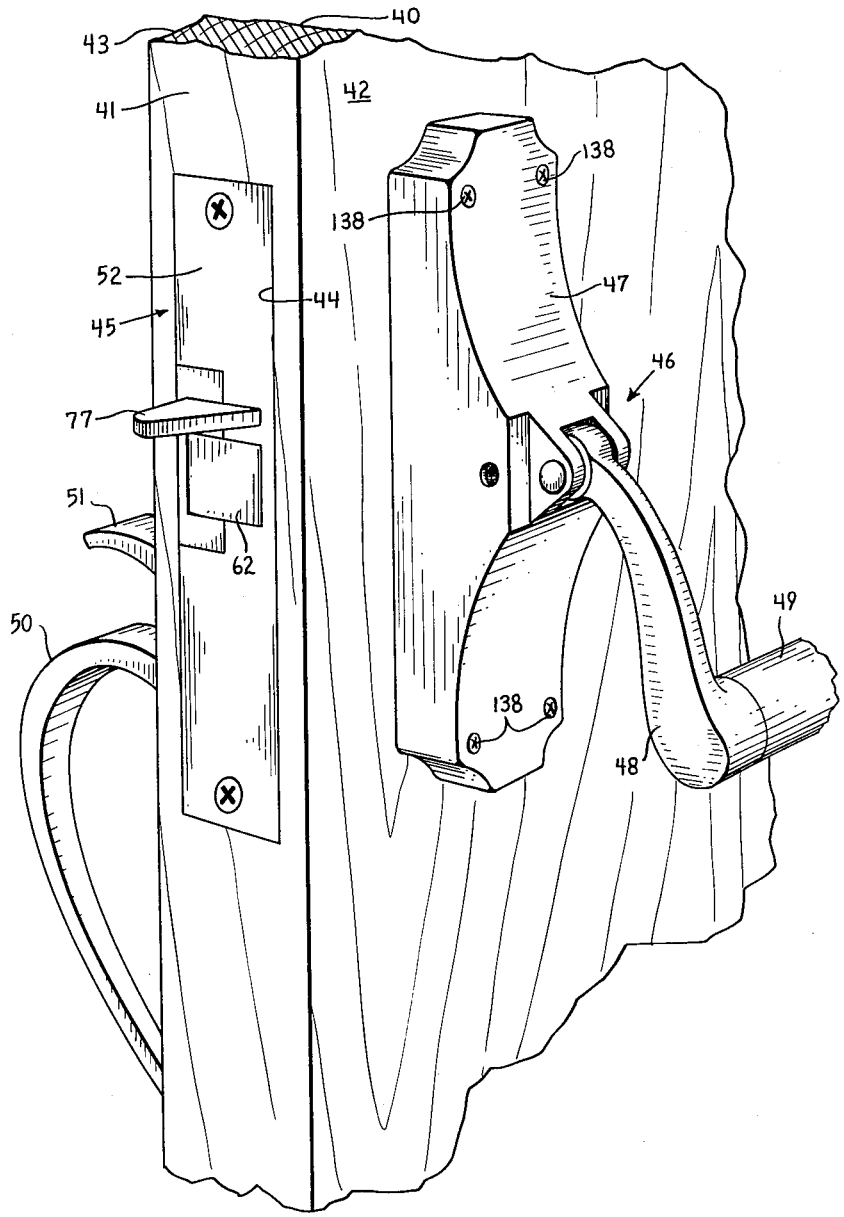
FIG_1
INVENTOR.
JOHN R. FOSTER
BY
Harold B. Hood
ATTORNEY

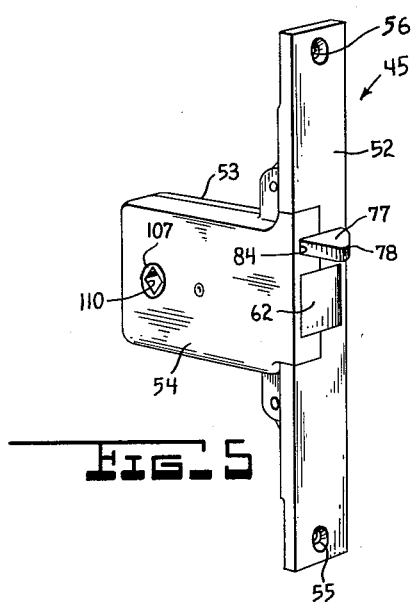
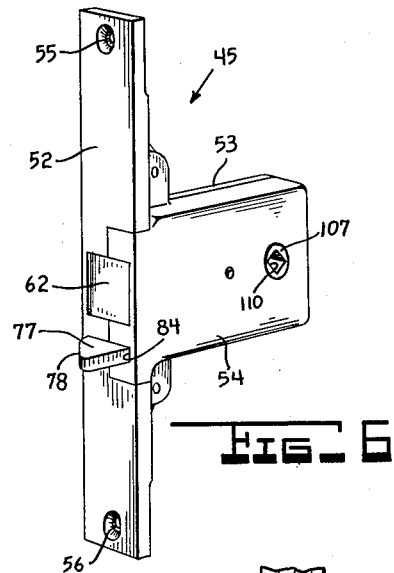
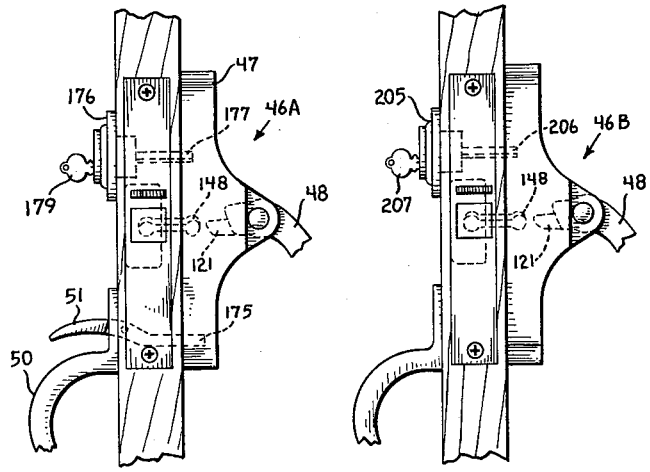
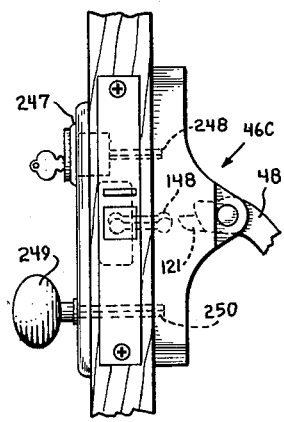

April 30, 1963 J. R. FOSTER 3,087,323
MORTISE-TYPE, REVERSE-PIVOTED LATCH MECHANISM
Filed March 7, 1960 8 Sheets-Sheet 3
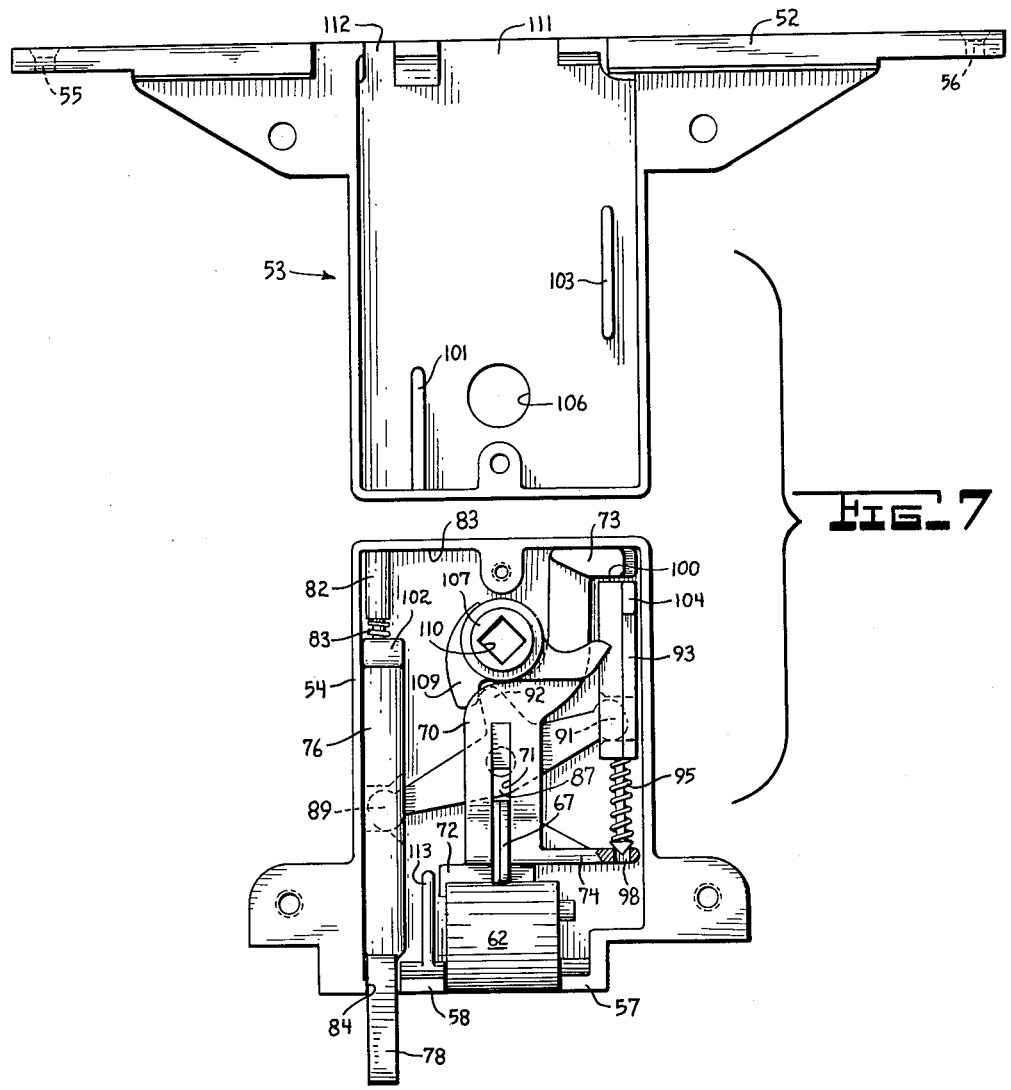
INVENTOR.
JOHN R. FOSTER
BY
Harold B. Hood
ATTORNEY April 30, 1963     J. R. FOSTER     3,087,323
MORTISE-TYPE, REVERSE-PIVOTED LATCH MECHANISM
Filed March 7, 1960     8 Sheets-Sheet 4
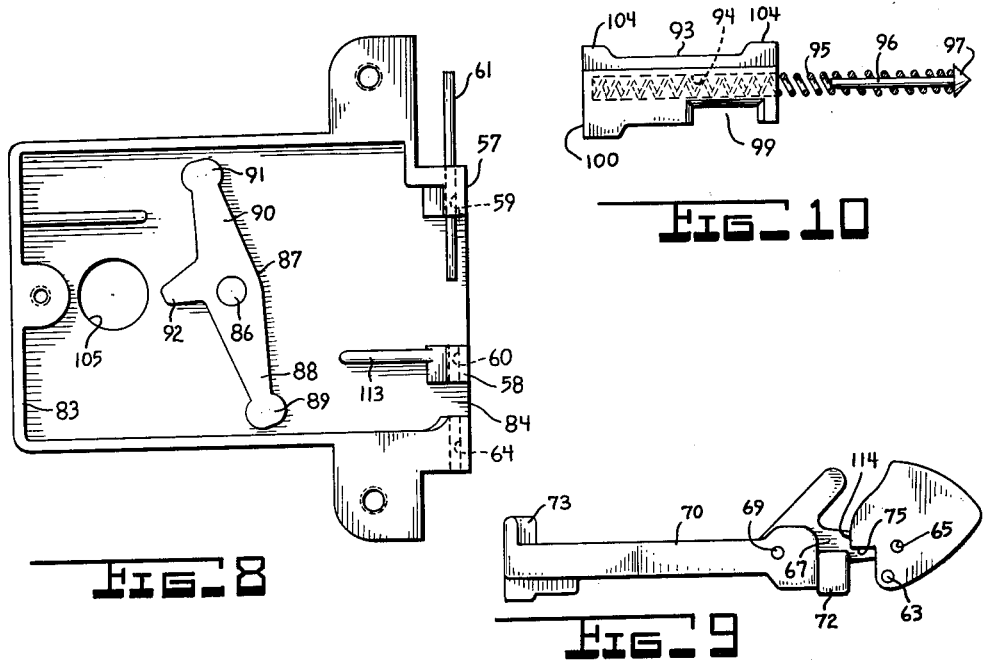
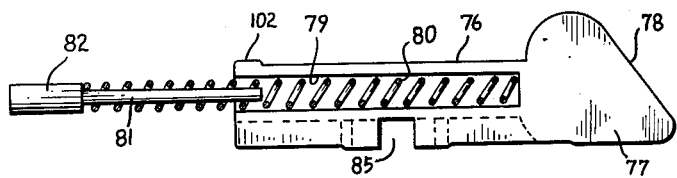
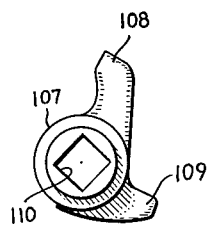
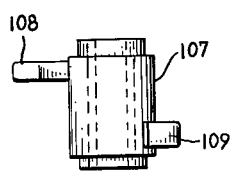
INVENTOR.
JOHN R. FOSTER
BY Harold B. Hood
ATTORNEY

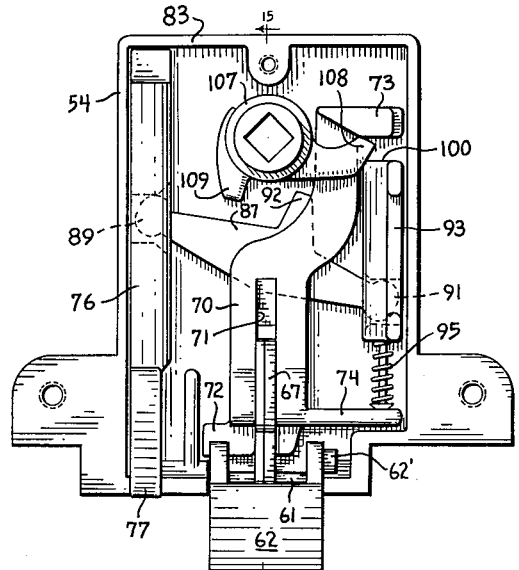
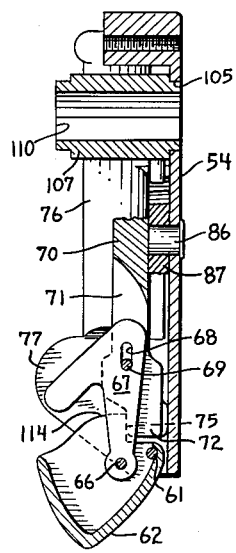
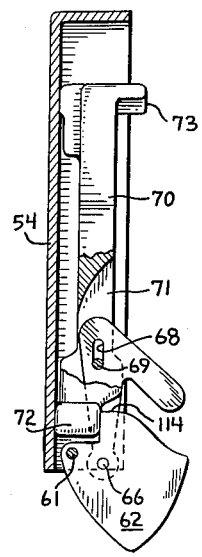
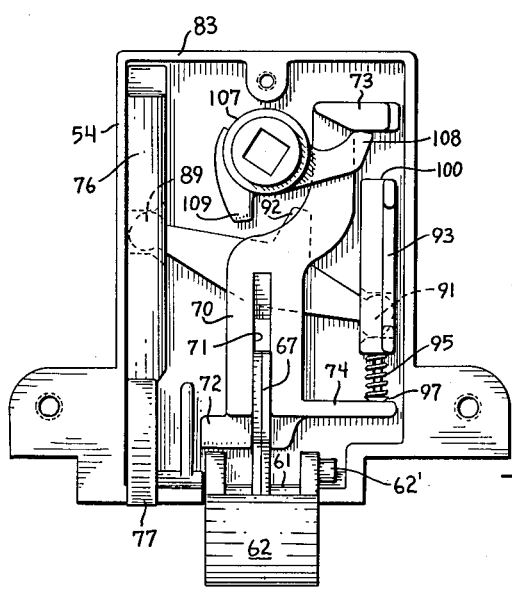
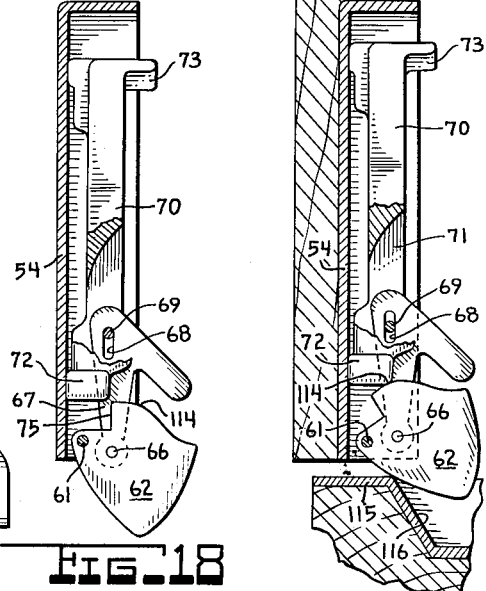

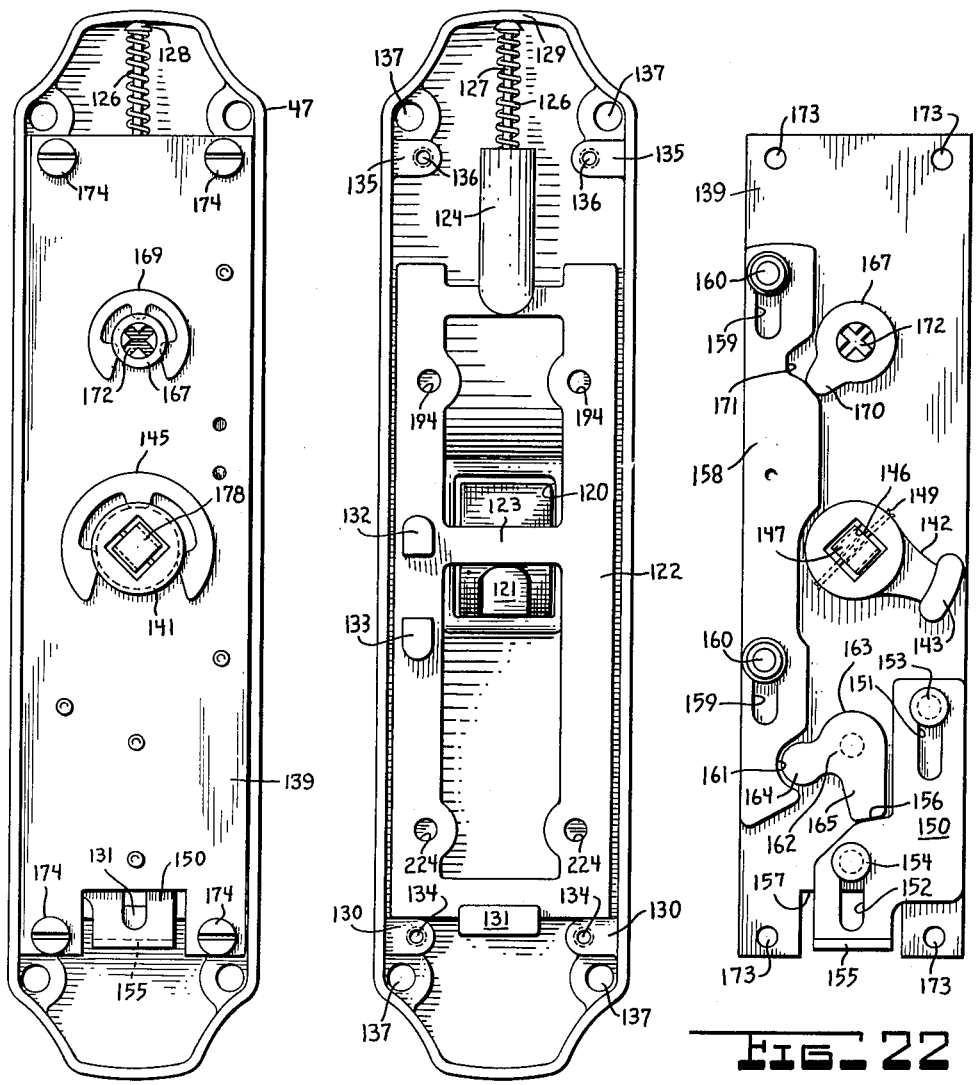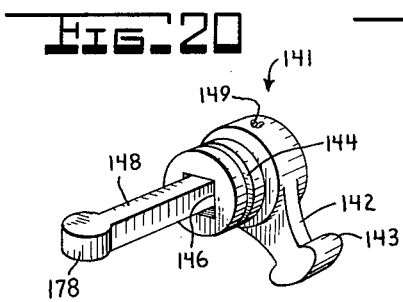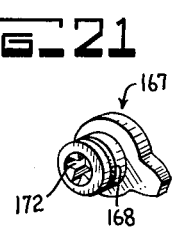

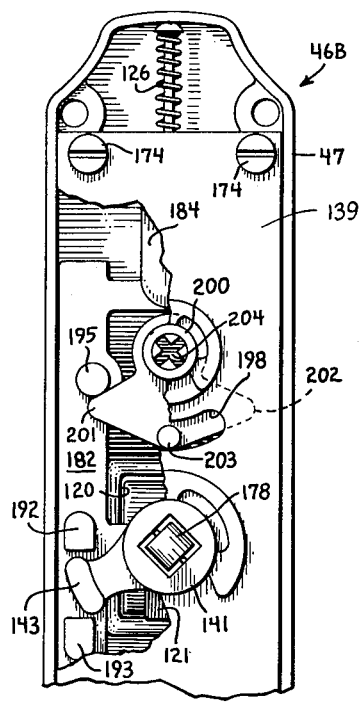
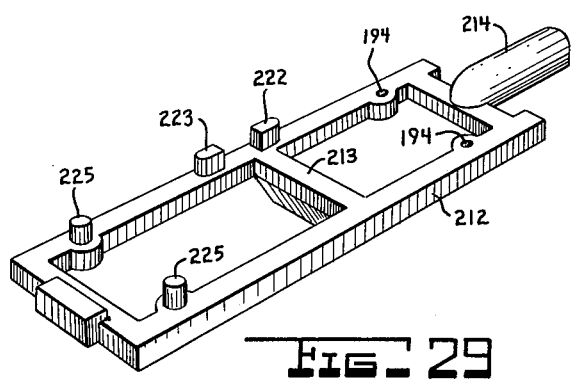
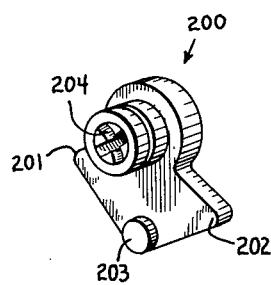
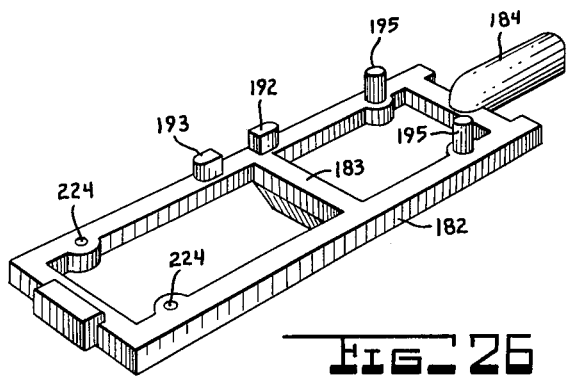

April 30, 1963  J. R. FOSTER  3,087,323
MORTISE-TYPE, REVERSE-PIVOTED LATCH MECHANISM
Filed March 7, 1960  8 Sheets-Sheet 8

INVENTOR.
JOHN R. FOSTER
BY
Harold B. Hood
ATTORNEY

United States Patent Office 3,087,323
Patented Apr. 30, 1963

3,087,323
MORTISE-TYPE, REVERSE-PIVOTED LATCH
MECHANISM
John R. Foster, Indianapolis, Ind., assignor to Vonnegut Hardware Company, Indianapolis, Ind., a corporation of Indiana
Filed Mar. 7, 1960, Ser. No. 13,220
22 Claims. (Cl. 70—92)

The present invention relates to latch mechanism and is primarily concerned with the provision of such a mechanism which is peculiarly useful in the form of a mortise-type panic exit latch assembly. As is well known, a panic exit latch assembly is one which, though it may be blocked against retractile actuation from outside the enclosure guarded by a door on which it is mounted, is always freely actuable from the inside of the enclosure by outwardly-directed pressure upon an actuating mechanism such as a panic bar substantially spanning the interior surface of the door.

It is obvious that, when a latch assembly includes a reciprocable or slidable latch bolt which engages an inwardly-facing surface of a strike plate or socket to restrain the door against opening movement, pressure exerted in an outward direction against the internal surface of the door increases the frictional engagement of the latch bolt against the strike, creates a wedging action and thereby tends to hinder latch bolt retraction. One major object of the present invention, then, is to provide, in a latch mechanism of the character under consideration, a so-called roll-back latch bolt which will be moved freely in a retractile direction under the influence of outwardly directed pressure exerted against the door, except when that bolt is blocked against such movement by deadlock means which, in turn, is withdrawable from blocking association with the latch bolt by actuation of manually manipulable means. A roll-back latch bolt may be defined as a latch bolt which is mounted for pivotal movement between projected and retracted position and which, in moving in a retractile direction, moves generally oppositely with respect to the direction of opening movement of the door with which it is associated.

A further object of the invention is to provide in association with such a latch bolt and deadlock means, an auxiliary latch bolt resiliently biased toward projected position and acting, when so projected, to hold the deadlock means out of blocking association with the main latch bolt and, when retracted by engagement with the conventional strike plate, to urge the deadlock means toward blocking association with the main latch bolt.

A further object of the invention is to provide, in association with the parts just described, panic bar means capable of withdrawing the deadlock means from blocking association with the main latch bolt, regardless of the current position of the auxiliary latch bolt.

A still further object of the invention is to provide, in association with the parts just described, means manipulable from outside the door to retract the deadlock means, regardless of the position of the auxiliary latch bolt.

It is further an object of the present invention to provide a latch mechanism of the character described in which the assembly comprising the main latch bolt, the auxiliary latch bolt, the deadlock means and the means operatively associating those elements, is selectively associable with either a right-hand hinged door or a left-hand hinged door, by mere inversion of the assembly without modification or substitution of any of its parts.

A still further object of the invention is to provide, in combination with such a latch assembly, an actuator assembly including a panic bar and including also any one of a plurality of different forms of means, manipulable from outside the door, to withdraw the deadlock means in order to free the roll-back latch bolt for retraction. In that connection, I have shown a panic bar assembly comprising a case with which may be selectively associated any one of a plurality of pairs of latch actuator slide and mechanism-carrying back plate whereby, by a proper selection of a suitable pair, the deadlock means of the latch assembly may be withdrawn by night latch actuation, by depression of a thumb piece or by rotation of a conventional door knob; and in the latter two assemblies I have shown lock-actuated means for preventing such actuation of the thumb piece or of the door knob as will withdraw the deadlock means.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a perspective view of a fragment of a door, showing my latch assembly, a fragment of my panic bar assembly and a thumb piece type of externally accessible manipulator means;

FIG. 2 is an edge elevation, drawn to a smaller scale, of the assembly shown in FIG. 1;

FIG. 3 is a similar elevation of an assembly arranged for night latch actuation;

FIG. 4 is a similar view of an assembly arranged for manipulation by a conventional door knob;

FIG. 5 is a perspective view, drawn to a somewhat larger scale, of my latch assembly in an attitude appropriate for assembly with a right-hand hinged door of the type illustrated in FIG. 1;

FIG. 6 is a similar view showing the latch assembly in an attitude for association with a left-hand hinged door;

FIG. 7 is a plan view of my latch assembly, drawn to a still larger scale, and showing the cover and face plate for the latch assembly turned back away from the frame, in which the cooperating parts of the latch assembly are shown in a position in which the roll-back latch bolt is fully retracted while the auxiliary latch bolt is fully projected;

FIG. 8 is a plan view of the latch assembly frame with most of the cooperating parts removed therefrom;

FIG. 9 is a side elevation of the roll-back latch bolt, the latch actuator, the link which provides an operative connection between the bolt and the actuator, and the deadlock means shown in non-blocking relation to the latch bolt, all as viewed from the left in FIG. 7;

FIG. 10 is a side elevation of the slide for advancing the latch actuator, together with its spring and guide pin through which it exerts force upon the latch actuator;

FIG. 11 is an end elevation of a hollow cam cooperable with the latch actuator, under certain circumstances, to withdraw the deadlock means;

FIG. 12 is a side elevation of said cam;

FIG. 13 is a side elevation of the auxiliary latch bolt together with its spring and guide pin, as viewed from the left of FIG. 7;

FIG. 14 is a view similar to FIG. 7 but showing the auxiliary latch bolt fully retracted, the roll-back latch bolt fully projected and the deadlock means in blocking association with the roll-back latch bolt;

FIG. 15 is a section taken substantially on the line 15—15 of FIG. 14 and looking in the direction of the arrows;

FIG. 16 is a section through the latch assembly and showing the roll-back latch bolt in fully projected position with the deadlock means in blocking association therewith, as viewed from the left of FIG. 14;

FIG. 17 is a view similar to FIG. 14 but showing the deadlock means withdrawn from blocking association with the roll-back latch bolt, in spite of the retracted position of the auxiliary latch bolt;

FIG. 18 is a section, looking from the left of FIG. 17 and showing the parts in the positions of FIG. 17;

FIG. 19 is a view similar to FIG. 18 but showing the roll-back latch bolt in an intermediate position under the influence of opening movement of the door relative to its associated strike plate;

FIG. 20 is a rear elevation of the panic bar assembly illustrated in FIG. 2;

FIG. 21 is a similar view with the back plate removed from the assembly;

FIG. 22 is a front elevation of the back plate and its associated elements after it has been folded back away from the assembly of FIG. 21;

FIG. 23 is a perspective view of a cam carried by the back plate of FIG. 22;

FIG. 24 is a perspective view of another such cam;

FIG. 25 is a fragmental view, similar to FIG. 20, but showing the assembly of FIG. 3, parts being broken away for clarity of illustration;

FIG. 26 is a perspective view of the latch control slide which is embodied in the assembly of FIG. 25;

FIG. 27 is a perspective view of a cam carried by the back plate of FIG. 25;

FIG. 29 is a perspective view of the latch control slide embodied in the assembly of FIG. 28;

Figure 28:
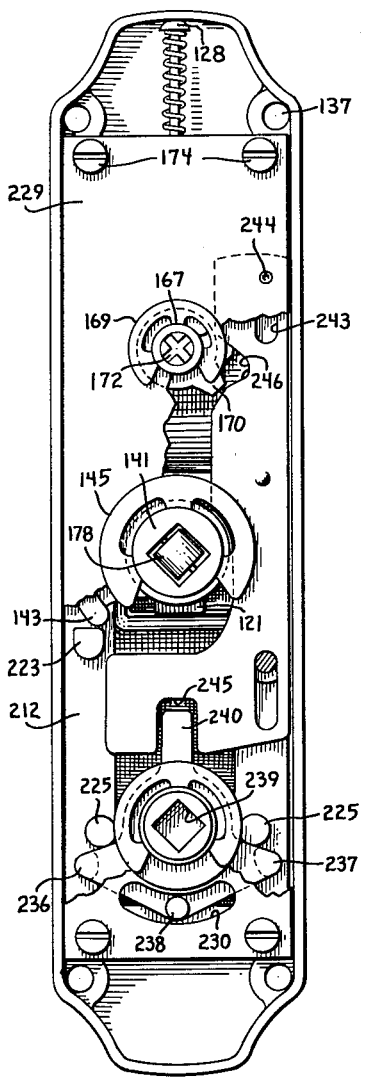
FIG. 28 is a view similar to FIG. 20 but showing the assembly of FIG. 4, parts being broken away for clarity of illustration.

Referring more particularly to the drawings, it will be seen that I have illustrated a fragment of a door 40 having a movable edge 41, an interior surface 42 and an exterior surface 43. Seated in a conventional mortise cavity 44 in the door edge 41 is a latch assembly 45 including a face plate 52, a main latch bolt 62 and an auxiliary latch bolt 77.

Mounted upon the internal surface 42 of the door near the edge 41 is a panic bar assembly indicated generally by the reference numeral 46 and including a case 47 from which is pivotally supported a lever 48, the outer end of which supports one end of a conventional panic bar 49. It will be understood that the other end of the bar will be suitably supported on a similar lever which, in turn, is conventionally pivotally supported from another case (not shown) mounted on the interior surface of the door near the hinged edge thereof in accordance with conventional practice.

Externally accessible manipulating means will ordinarily be mounted on the surface 43 of the door and, in FIG. 1, such means comprises a handle 50 and a thumb piece 51.

As is more clearly shown in FIGS. 5 and 6, the latch assembly 45 comprises a face plate 52 with which is integrally formed a cover 53 for a box like latch assembly frame 54. At its opposite ends, the face plate 52 is formed with screws holes 55 and 56 which, as will be seen, are substantially symmetrically spaced from the median horizontal plane bisecting the latch bolt 62, whereby the assembly 45 may be mounted in a conventional mortise socket in a door edge either in the attitude illustrated in FIG. 5 or in the attitude illustrated in FIG. 6, without modification and without substitution of parts.

At its forward or outer end, the frame 54 is formed to provide aligned bosses 57 and 58 (see FIGS. 7 and 8); and said bosses are formed with coaxial through bores 59 and 60, respectively, in which is supported a hinge pin 61 for the main latch bolt 62. As is most clearly seen in FIGS. 9, 15, 16, 18 and 19, said latch bolt is suitably formed with a through bore 63 which is penetrated by the pin 61 to support the latch bolt for pivotal movement relative to the frame 54 in such manner that, as said bolt moves from its projected position of, for instance, FIGS. 14 to 18 toward its retracted position of FIG. 7, its direction of movement is generally opposite to the direction of opening movement of the door edge 41.

Preferably, a further bore 64 (FIG. 8) is formed in the frame 54, coaxial with the bores 59 and 60, to facilitate removal of the hinge pin 61 for disassembly.

At a point spaced from the bore 63, the latch bolt 62 is formed with a second through bore 65 for the reception of a pin 66 (FIG. 15) which passes also through an eye of a link 67 to provide an operative connection between said link and the latch bolt 62. Near its opposite end, the link 67 is formed with an elongated slot 68 in which is received a pin 69 carried by a latch actuator 70 and spanning a slot 71 in said actuator, in which the link 67 is received. Thus, a lost motion driving connection is provided between the actuator 70 and the latch bolt 62.

The actuator 70 is mounted for slidable reciprocation in the frame 54 and, at its forward end, carries deadlock means 72 which, as is most clearly illustrated in FIGS. 16, 18 and 19, is arranged for cooperative association with a shoulder 75 formed on the latch bolt 62. At its rearward end, the actuator 70 is formed with an abutment 73 for a purpose which will appear, and near its forward end, said actuator carries a further abutment 74 for a purpose which will appear.

An auxiliary latch bolt 76 is mounted for reciprocation in the frame 54 and is formed to provide, at its forward end, a head 77 having a camming surface 78, the arrangement of the bolt 76 being such that its head is movable between a projected position and a retracted position. The shank of the bolt 76 is formed with an axial half-socket 79 in which is received an end of a coiled spring 80; and a guide pin 81 has its shank telescoped within the opposite end of the spring 80 and is formed with an enlarged head 82 against which said spring abuts. The shank of the latch bolt 76 is positioned with the open side of its half-socket 79 in juxtaposition to one wall of the frame 54, whereby the spring 80 is retained within said socket, and its head 77 slidably projects through, and is guided in, a slot 84 in the front wall of the frame 54, and a mating slot 112 in the face plate 52 (FIG. 7). The rearward end of the pin head 82 bears against the rear wall 83 of the frame 54, thus compressing the spring 80 to bias the latch bolt 76 toward projected position. In its lower edge surface, the latch bolt 76 is formed with a wide mouthed notch 85.

A pivot pin 86 projects upwardly from the floor of the frame 54 (FIG. 8) and provides a pivotal mounting for a lever 87 having oppositely projecting arms 88 and 90 of substantially equal length. The arm 88 is formed with a part-cylindrical head 89 which is operatively received in the notch 85 of the latch bolt 76 (FIG. 7); and the arm 90 terminates in a similar head 91 for a purpose which will appear. The lever 87 is further formed with a finger 92 projecting, substantially midway between its ends, in a direction substantially perpendicular to a line joining the heads 89 and 91.

Mounted for reciprocation within the frame at the side thereof opposite the location of the auxiliary latch 76 is a slide 93 (FIGS. 7 and 10) which is formed with a longitudinally extending socket 94 in which is seated one end of a spring 95. The opposite end of said spring telescopically receives the shank of a guide pin 96 which terminates in a pointed head 97 which is seated in a socket or perforation 98 in the forward abutment 74 of the actuator 70. The lower edge of the slide 93 is formed with a wide mouthed socket 99 in which is operatively received the head 91 of the lever arm 90 (FIG. 7). Thus, a driving connection is provided between the auxiliary latch bolt 76 and the slide 93, enforcing substantially equal and opposite movement of the slide 93 in response to movement of the auxiliary latch bolt 76; and a resilient, one-way driving connection is provided between the slide 93 and the latch bolt actuator 70.

The rear end 100 of the slide 93 faces the abutment 73 of the actuator 70 for a purpose which will appear.

A raised rib 101 on the frame cover 53 is positioned for cooperation with a boss 102 on the auxiliary latch bolt 76 to guide that bolt in its reciprocation; and a raised rib 103 on said cover is positioned for cooperation with bosses 104, 104 at opposite ends of the slide 93 to guide that slide in its reciprocation.

The floor of the frame 54 is formed, near its rear end, with a bearing aperture 105 (FIG. 8) and the cover 53 is formed with a similar bearing aperture 106 which, when the cover is associated with the frame, is coaxial with the aperture 105. The opposite ends of a hollow cam 107 are journal mounted in said bearing apertures 105 and 106. As is most clearly illustrated in FIGS. 7, 11 and 12, said cam 107 is formed with a first finger 108 positioned for cooperative engagement with the abutment 73 to withdraw the actuator 70 upon counter-clockwise movement of the cam, and with a second finger 109 positioned for engagement with the finger 92 of the lever 87 to rock that lever in a direction to retract the auxiliary latch bolt 76 and to advance the slide 93, upon counter-clockwise movement of said cam. Said cam is further formed with an axial socket 110 of polygonal cross section, for a reason which will appear.

The face plate 52 is formed with a notch 111 for the accommodation of the roll-back latch bolt 62.

Operation of Latch Assembly

When the door with which the present latch assembly is associated is open, the parts will assume the positions of FIG. 7, in which the auxiliary latch bolt 76 is fully projected under the influence of the spring 80. Thereby, the lever 87 is held resiliently at the counter-clockwise end of its stroke, whereby the slide 93 is fully retracted and, by engagement of its end 100 with the abutment 73, holds the latch actuator 70 in fully retracted position. The pin 69 will be at the rear end of the slot 68, and the latch bolt 62 will thereby be held in retracted position.

Now, as the door is moved to closed position, the camming surface 78 of the head 77 of the latch bolt 76 will engage the strike plate whereby the auxiliary latch bolt will be shifted to the retracted position of, for instance, FIG. 14, thus rocking the lever 87 in a clockwise direction to force the slide 93 forwardly, compressing the spring 95 to impress a forwardly-directed force on the actuator 70. During the first portion of this movement of the parts, the latch bolt 62 will be in engagement with the strike plate and so will be held against advancement toward fully projected position. However, as the latch bolt 62 attains registry with the socket of the strike plate, it will be freed for projection, and the spring 95 will move forwardly the actuator 70. Through the action of the pin 69 on the forward end of the slot 68 in the link 67, the bolt 62 will be swung about the hinge 61 to the fully projected position of FIG. 18, where it will be stopped by engagement of the lug 62′ with the forward wall of the frame 54. As the latch bolt 62 attains the position of FIG. 18, its camming surface 114 will clear the path of the deadlock means 72 of the actuator 70, and the spring 95 will advance the actuator 70 to the position of FIGS. 14 and 16, in which the deadlock means 72 underlies the shoulder 75 of the latch bolt 62 to restrain said latch bolt against retractile movement. In this condition of the parts, the latch bolt 62, by engagement with the surface 116 of the socket of the strike plate 115 (FIG. 19), will hold the door against opening movement.

It will be apparent that the only thing which restrains the latch bolt 62 against movement toward its retracted position is the deadlock means 72, since the activator 70 is only resiliently held, by the spring 95, against movement toward the rear of the frame 54. Thus, whenever the deadlock means 72 is withdrawn from the path of the shoulder 75, the bolt 62 is free to swing, about its hinge pin 61, in a retractile direction, and therefore the door 40 may be freely opened by pressure exerted against its inner surface 42.

Withdrawal of the deadlick means to the position of FIG. 18 can be accomplished by projection of the auxiliary latch bolt 76, under the influence of the spring 80, to an intermediate position between the position of FIG. 17 and the position of FIG. 7. That is, as the bolt 76 begins to advance from the position of FIG. 17, the lever 87 begins to rock in a counter-clockwise direction. The slide 93 is thus moved rearwardly until its end 100 engages the abutment 73. Now, further advancing movement of the bolt 76 will entrain the actuator 70 with the continued movement of the slide 93 to withdraw the deadlock means 72 from beneath the shoulder 75, the pin 69 moving from the forward end of the slot 68 to the rearward end thereof, until the parts attain the positions of FIG. 18. Until that condition is reached, however, the deadlock means prevents retractile rocking of the latch bolt 62. Thus, it will be seen that, although there may be substantial clearance between the door edge 41 and the adjacent face the strike plate 115, so long as the strike plate holds the auxiliary latch 76 far enough back to keep the deadlock means 72 even partially engaged with the shoulder 75, the door cannot be opened.

Once the deadlock means 72 attains the position of FIG. 18, however, the door may be freely opened, the latch bolt 62 being rolled back by engagement with the corner of the strike plate socket, and the cam surface 114 of the bolt 62 acting against the deadlock means 72 in the manner illustrated in FIG. 19 to force the actuator 70 back to its fully withdrawn position.

Withdrawal of the actuator 70 to shift the deadlock means 72 to the position of FIG. 18 can be effected by counter-clockwise turning movement of the cam 107, the finger 108 of said cam engaging the abutment 73 to shift the actuator 70 rearwardly without affecting the auxiliary latch bolt 76, the lever 87 or the slide 93, but compressing the spring 95. As will be seen from a consideration of the drawings and the above description, a very slight withdrawal of the actuator is sufficient to release the bolt 62 for retractile movement; but continued rotational movement of the cam 107 in a counter-clockwise direction will cause the actuator, acting through the pin 69 and the link 67, positively to retract the bolt 62.

A rib 113 upstanding from the floor of the frame 54 helps to guide the actuator 70 in its reciprocatory movement.

The Several Actuating Assemblies

Figure 30:
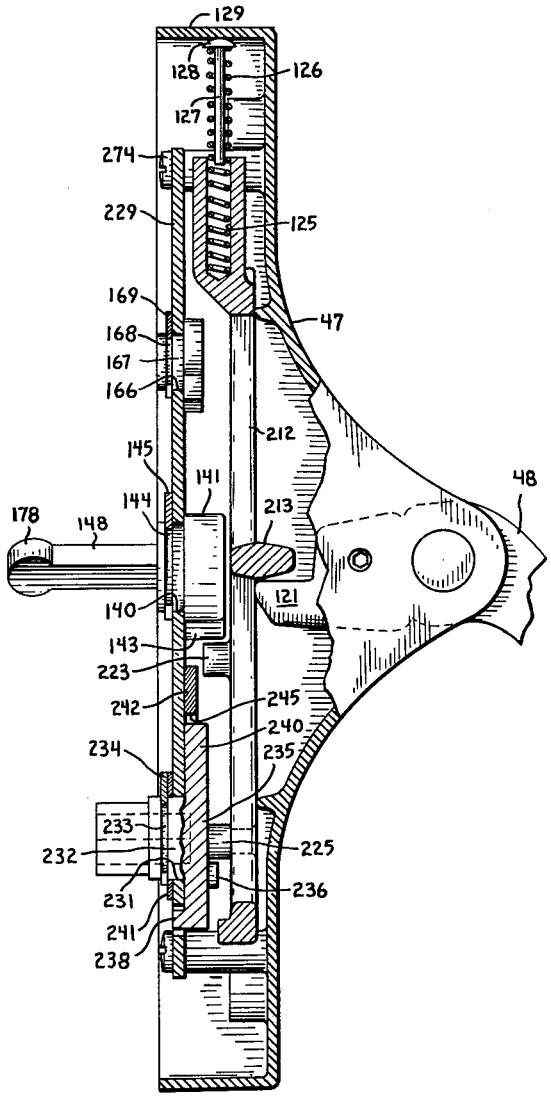
FIG. 30 is a substantially central, vertical section through FIG. 28.
Figure 31:
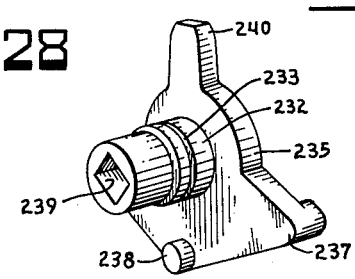
FIG. 31 is a perspective view of a cam carried by the back plate of FIG. 28.

The case 47 is substantially centrally formed with a port 120 (FIG. 21) through which a finger 121 on the lever 48 projects to the interior of the case. Slidably reciprocably mounted within the case is a latch control slide 122 which is formed to provide a substantially central cross bar 123 beneath which the finger 121 operatively engages. At its upper end, the slide 122 is formed with a hollow stud 124, the socket 125 in which opens upwardly (FIG. 30) to receive one end of a coiled spring 126. A guide pin 127 is telescopically received in the other end of the spring 126 and terminates in a rounded head 128 forming an abutment for the adjacent spring end and being positioned in engagement with the upper end wall 129 of the case 47 to compress the spring 126 and impress a resilient downward force upon the slide 122. The slide 122 is thus resiliently held in engagement with abutments 130, 130 near the lower end of the case 47.

At its lower end, the slide 122 is provided with a lug or abutment 131 for a purpose which will appear; and on its rearward face, said slide is provided with a pair of spaced, rearwardly projecting posts 132 and 133. Tapped sockets 134, 134 are formed in the abutments 130, 130 and other tapped sockets 136, 136 are formed in abutments 135, 135 near the upper end of the case 47. The case is formed with a plurality of screw holes 137, 137 for the reception of screws 138, 138 whereby the case may be mounted on the interior surface 42 of the door 40.

A back plate 139 is arranged to close the back side of the case 47 and to retain the slide 122 in the case. Substantially at its center, said back plate is formed with a bearing aperture 140 (FIG. 30) in which is journalled an oscillable cam 141 having a radially projecting lever arm 142 terminating in a radiused head 143. When the back plate 139 is in place, the head 143 of the lever 142 is operatively engaged between the posts 132 and 133 so that oscillation of the cam 141 will cause reciprocating movement of the slide 122. As is most clearly illustrated in FIGS. 23 and 30, the cam 141 is formed with a peripheral groove 144 which, when the cam is mounted in its bearing aperture 140, is located just beyond the plane of the rearward face of the back plate 139; and a snap ring 145, engaged in said groove 144, retains the cam 141 against axial movement relative to the back plate 139. The cam 141 is formed with a socket 146 of polygonal cross section, and the part-cylindrical head 147 of a spindle 148 is received within said socket and is pivotally retained therein by means of a hinge pin 149, the spindle projecting rearwardly beyond the rear face of the back plate in the manner which is apparent in FIG. 30 and in FIGS. 2, 3 and 4.

A lift plate 150 (FIG. 22) is formed with a pair of parallel, elongated slots 151 and is reciprocably mounted on the forward face of the back plate 139 by means of headed posts 153 and 154 passing through said slots, respectively. At its lower end, the lift plate 150 is provided with a forwardly projecting tongue 155 which, when the back plate is in place in the case, is positioned for operative engagement with the lug or abutment 131 so that, when the plate 150 is moved upwardly with respect to the back plate 139, said tongue will engage the lug 131 to lift the slide 122, independently of the finger 121, against the tendency of the spring 126.

The plate 150 is formed with an upwardly facing shoulder 156 for a purpose which will appear, and the lower end of the back plate 139 is slotted as at 157 to provide access to the lower end of the lift plate 150.

A blocker slide 158 is formed with a pair of aligned, longitudinal slots 159 and is mounted, for sliding reciprocation, on the forward face of the back plate 139 by means of headed posts 160, 160 penetrating those slots and secured to the back plate. Near its lower end, the slide 158 is formed with a notch 161.

Between the plate 150 and the slide 158, a trunnion 162 projects from the forward surface of the back plate 139 and provides a pivotal mounting for a blocker lever or cam 163, one arm 164 of which is radiused and extends operatively into the notch 161 of the blocker slide 158. The other arm 165 of the lever 163 is movable into and out of blocking engagement with the shoulder 156 of the plate 150.

It will be obvious that, with the parts in the position of FIG. 22, the lift plate 150 is held against upward movement; but that, when the blocker slide 158 is moved upwardly to the limit of its throw, as determined by the length of the slots 159, the lever arm 164, by its engagement in the notch 161, will be entrained with that movement to turn the lever 163 in a clockwise direction to shift the arm 165 thereof out of engagement with the shoulder 156, whereby the lift plate 150 will be freed for upward movement relative to the back plate 139.

The back plate 139 is formed with a further bearing aperture 166 (FIG. 30) in which is journal mounted a further cam 167. As is most clearly shown in FIGS. 24 and 30, the cam 167 is formed with a peripheral groove 168 which, when the cam is mounted in the aperture 166, is disposed just beyond the rearward face of the back plate 139 and receives a snap ring 169 whereby it is retained against axial movement relative to said back plate. The cam 167 is provided with a radially projecting finger 170 operatively engageable in a further notch 171 in the blocker slide 158. Said cam is formed with an axial, polygonal socket 172 for the reception of a spindle, later to be described, whereby said cam may be manipulated to shift the blocker slide 158 in either direction between the limits of its throw. It will be seen that the proportions of the finger 170 and notch 171 are such that, at either end of the throw of the blocker slide 158, the finger 170 may be disengaged from the notch 171 to permit complete revolution of the cam 167.

The back plate 139 is formed with screw holes 173, 173 proportioned and arranged to register with the tapped sockets 134 and 136 of the case 47 and to pass screws 174, 174 taking into those sockets, whereby the back plate may be secured in place to close the back of the case 47 and to hold the cam head 143 and lift plate tongue 155 in cooperative engagement with the posts 132, 133 and the lug 131, respectively, of the latch control slide 122.

*Operation of Thumb Piece Actuated Assembly*

The assembly just described, and illustrated in FIGS. 20 through 24, is shown, in FIGS. 1 and 2, mounted on a door in cooperative association with a conventional handle 50, thumb piece 51 and barrel-type lock assembly 176. The thumb piece 51 is formed to provide a lever arm 175 which, when the several parts are mounted on the door to complete the assembly designated 46A in FIG. 2, projects through the slot 157 of the back plate 139 and engages operatively beneath the tongue 155 of the lift plate 150. Supported from the barrel of the lock assembly 176 is a conventional leaf-type spindle 177 which, when the parts are so assembled, operatively engages in the socket 172 of the cam 167, whereby said cam may be actuated by manipulation of the lock barrel. As has been stated, the finger 121 of the level 48 extends through the port 120 of the case 47 and operatively engages beneath the cross bar 123 of the latch control slide 122. The end 178 of the spindle 148 enters the inner end of the socket 110 of the cam 107 which projects through the cover 53 of the latch assembly frame.

Remembering that when the door is closed the auxiliary latch bolt 76 will be held, by the strike plate, in a position sufficiently retracted to locate the deadlock means 72 in blocking relation to the shoulder 75 of the roll-back latch bolt 62, it will now be seen that, if the panic bar 49 is moved toward the door 40, the finger 121 will be lifted to raise the latch control slide 122 against the tendency of the spring 126. The post 133 of the slide 122 will entrain the arm 142 of the cam 141 to turn the spindle 148 in a counter-clockwise direction as viewed in FIG. 22 (a clockwise direction as viewed in FIG. 20). It will be apparent that such movement of the cam 141 will not be affected by the position of the blocker mechanism 158, 163. Since the head 178 of the spindle 148 is operatively engaged in the polygonal socket 110 of the cam 107, such turning movement of the cam 141 will be transmitted to the cam finger 108 which, engaging the abutment 73 in the manner illustrated in FIG. 14, will be moved to the position of FIG. 17 to withdraw the deadlock means 72 from beneath the shoulder 75 of the roll-back latch bolt 62. As soon as the deadlock means 72 thus clears the shoulder 75, the outward pressure on the bar 49, being transmitted to the door 40, will cause the door to move in an opening direction, the latch bolt 62 dragging across the corner of the strike plate 115 and freely rolling backwardly toward retracted position, concurrently acting, through its camming surface 114, to shift the actuator 70 farther rearwardly. Such rearward movement of the actuator 70 is permitted, in spite of the retracted position of the auxiliary latch bolt 76, and the lever 87, because of the resilient connection between the actuator abutment 74 and the slide 93, which is held in its forward position by the lever 87. As soon as the auxiliary latch bolt head 77 clears the strike plate, the auxiliary latch bolt will be projected by the combined action of the springs 80 and 95 and the parts will move to the positions of FIG. 7.

It will be noted that there is a positive connection between the panic bar 49 and the latch bolt 62 through the pin 69, whereby complete depression of the panic bar will positively move the latch bolt 62 to fully retracted position, in case of any sticking or obstruction which might tend to interfere with the free roll-back action of the latch bolt 62 as described above.

When the pressure against the panic bar 49 is released and the door tends to move toward closed position, the camming face 78 of the head 77 of the auxiliary latch bolt 76 will engage the strike plate and the auxiliary bolt will be moved toward retracted position, whereby, as the door attains fully closed condition, the latch bolt 62 will be projected into the socket of the strike plate and blocked in projected position in the manner above described in connection with the operation of the latch assembly.

When the blocker slide 158 is in the position of FIG. 22, the lift plate 150 is positively held against actuation by the finger 175 of the thumb piece 51, and thus the door is held against unauthorized opening from outside. However, by manipulation of the key 179, the barrel of the lock 176 may be turned in a counter-clockwise direction as viewed in FIG. 20 (clockwise as viewed in FIG. 22) to enter the finger 170 into the notch 171 and to shift the blocker slide 158 upwardly to the limit of its stroke. Rotation of the key may then be continued to complete one full revolution, the finger 170 leaving the slot 171 after the blocker slide has attained its uppermost position, so that the key may be withdrawn from the lock. Such upward movement of the blocker slide 158 turns the lever 163 in a clockwise direction as viewed in FIG. 22 to shift the arm 165 thereof out of blocking association with the shoulder 156 of the lift plate 150. Now, if the thumb piece 51 is depressed, the lever arm 175, engaging the tongue 155, will lift the plate 150 and, since the tongue 155 is operatively engaged with the lug 131 on the latch control slide 122, said slide will be lifted against the tendency of the spring 126. The parts are so proportioned and designed that such movement of the thumb piece 51 will lift the slide 122 far enough to turn the cam 141 to a degree sufficient to move the actuator 70 to the position of FIG. 18, whereafter a pull exerted on the handle 50 will cause the bolt 62 to be rolled back to retracted position in the manner above described.

When it is again desired to lock the door against unauthorized entry from outside, the key 179 will be manipulated to rotate the cam 167 in a counter-clockwise direction as viewed in FIG. 22, whereby the blocker slide 158 and the lever 163 will be returned to their illustrated positions.

If a night latch type of assembly is desired, as illustrated at 46B in FIG. 3, the slide 122 and the back plate 139 with its associated parts will be replaced by the actuator slide 182 shown in FIG. 26 and the back plate 199 and its associated parts shown in FIG. 25.

The slide 182 is identical with the slide 122 except that posts 195, 195 are rigidly mounted to project from the sockets 194, 194 of said slide. The slide 182 is positioned and arranged in the case 47 exactly as was the slide 122 and is provided with a cross bar 183 for engagement by the finger 121 and with posts 192 and 193 for engagement of the head 143 of the cam lever 142.

Said slide is provided with a hollow stud 184 for reception of an end of the spring 126.

The back plate 199 supports the cam 141 precisely as that cam was supported by the back plate 139. In the bearing aperture 166, however, there is journalled a cam 200 in place of the cam 167, above described. Said cam 200 is provided with opposite wings 201 and 202 positioned for alternative opposite engagement with the two posts 195, 195 of the slide 182; and a stop pin 203 projects from the rearward surface of the cam 200 to enter an arcuate slot 198 formed in the back plate 199. The cam 200 is formed with an axial, polygonal socket 204. The back plate 199 is secured in place, in the manner above described, by the screws 174.

*Operation of Night Latch Assembly*

As illustrated at 46B in FIG. 3, when the above assembly is mounted on a door in conjunction with a conventional barrel-type lock 205 having a spindle 206 carried by its barrel, said spindle is operatively engaged in the socket 204 of the cam 200. Actuation of the mechanism by the panic bar 49 is identical with that described above. This form of assembly, however, is so arranged that manipulation of the key 207 directly withdraws the actuator 70 to the position of FIG. 18 since, as the lock barrel turns in either direction, the spindle 206 will correspondingly turn the cam 200 whereby one or the other of the cam wings 201 and 202 will act upon the associated post 195 to lift the slide 182 against the tendency of the spring 126, thereby directly turning the cam 141 and the spindle 148 to turn the cam 107 and retract the actuator 70.

If external manipulating means including a conventional door knob is desired, the assembly designated by the reference numeral 46C and illustrated in FIGS. 4 and 28 to 31 will be used. For this purpose, a latch control slide 212 will be used in place of the slide 122 and a back plate 229 and associated parts will be substituted for the back plate 139 and its associated parts.

The latch control slide 212 is identical with the slide 122 except that posts 225, 225 project rearwardly from the sockets 224, 224 of said slide. The slide 212 includes a cross bar 213 beneath which the finger 121 operatively engages and is further provided with a hollow stud 214 to receive the lower end of the spring 126. Posts 222 and 223 are arranged to engage the cam lever head 143.

The back plate 229 carries the cam 141 in its bearing aperture 140 and carries the cam 167 in its bearing aperture 166. Near its lower end, the back plate 229 is formed with an arcuate slot 230 and with a further bearing aperture 231. A cam 232 is journalled in said aperture 231 and is formed with a peripheral groove 233 which receives a snap ring 234 to retain said cam against axial movement with respect to the back plate 229. In front of the back plate, the cam 232 is formed with a cam body 235 providing opposite cam wings 236 and 237 disposed, respectively, to engage beneath the posts 225, 225; and said cam body is further formed with a rearwardly projecting stop pin 238 which moves in the arcuate slot 230. The cam 232 is further formed with a polygonal, axial socket 239 for a purpose to become apparent. Still further, the cam body 235 provides an upwardly projecting finger 240. Preferably, a bushing 241 surrounds the cam 232 between the snap ring 234 and the rear face of the back plate 229.

A blocker slide 242 is formed with a pair of longitudinally extending slots 243 whereby it is supported, through the medium of headed posts 244, for reciprocation upon the rear surface of the back plate 229. In its lower end, the blocker slide 242 is formed with a notch 245 adapted, in the lowermost position of the slide, to receive the cam finger 240 to restrain the cam 235 against oscillation. Near its upper end, the slide 242 is formed with a laterally opening notch 246, similar to the notch 171 of the slide 158; and the finger 170 of the cam 167 is arranged to coact in a similar manner with the notch 246 to shift the slide 242 between its upper and lower limiting positions upon rotation of the cam 167.

When the assembly 46C is mounted upon a door in the manner illustrated in FIG. 4, the finger 121 of the lever 48 cooperates with the cross bar 213 of the slide 212 to move the actuator 70 precisely in the manner above described. The spindle 248 of the lock 247 enters the socket 172 of the cam 167 to provide for manipulation of said cam, and thereby of the slide 242, precisely in the manner above described with reference to the assembly 46A. When the slide 242 is in its lowermost position, the cam 232 is held against oscillation, but when the slide 242 is in its uppermost position, said cam 232 is free for manipulation to actuate the slide 212 and thereby to withdraw the actuator 70 from blocking position. A conventional door knob 249 having a shank 250 is arranged with the shank 250 operatively engaged in the socket 239 of the cam 232 so that, when the slide 242 is in its uppermost position, oscillation of the knob 249 in either direction will cause one of the wings 236 or 237 to act upon its associated post 225 to lift the slide 212 and thereby withdraw the actuator 70 to move the deadlock means 72 out of blocking association with the shoulder 75.

I claim as my invention:

1. In a device of the class described, a latch frame constructed and arranged to be mounted adjacent a movable edge of a swinging door, a main latch bolt pivotally supported from said frame upon an axis substantially parallel with the length of said door edge and movable about said axis between a position in which a portion of said bolt projects significantly beyond said door edge and a retracted position, said bolt portion moving toward its retracted position in a direction generally opposite to the direction of opening movement of said door, an auxiliary latch bolt supported from said frame and movable between a position in which a portion of said auxiliary bolt projects significantly beyond said door edge and a retracted position, means resiliently urging said auxiliary bolt toward projected position, deadlock means mounted in said frame for movement into and out of a position blocking said main latch bolt against retraction, a further element mounted for cooperation with said deadlock means and movable in one direction to urge said deadlock means toward such blocking position and in the opposite direction to withdraw said deadlock means from such blocking position, and means providing a positive, two-way connection between said auxiliary latch bolt and said further element.

2. In a device of the class described, a roll-back latch bolt mounted for pivotal movement between projected and retracted positions, an auxiliary bolt mounted adjacent said roll-back bolt for movement between projected and retracted positions, means resiliently urging said auxiliary bolt toward projected position, deadlock means mounted for movement into and out of a position blocking said roll-back bolt against retraction, a further element mounted for cooperation with said deadlock means and movable in one direction to urge said deadlock means toward such blocking position and in the opposite direction to withdraw said deadlock means from such blocking position, and means providing a positive, two-way operative connection between said auxiliary bolt and said further element.

3. The device of claim 2 in which said further means has a resiliently yieldable operative connection with said deadlock means in the direction to urge said deadlock means toward such blocking position and has a lost-motion, positive connection with said deadlock means in the direction to withdraw said deadlock means from such blocking position.

4. In a device of the class described, a roll-back latch bolt mounted for pivotal movement between projected and retracted positions, an auxiliary bolt mounted adjacent said roll-back bolt for movement between projected and retracted positions, means resiliently urging said auxiliary bolt toward projected position, deadlock means mounted for movement into and out of a position blocking said roll-back bolt against retraction, and means providing an operative connection between said auxiliary bolt and said deadlock means and effective, when said auxiliary bolt is in retracted position, to urge said deadlock means toward such blocking position, and, when said auxiliary bolt is projected, to withdraw said deadlock means from such blocking position, said means providing an operative connection between said auxiliary bolt and said deadlock means comprising a lever mounted upon a pivotal axis adjacent said bolts and having a first arm operatively engaged with said auxiliary bolt, a movable member, said lever having a second arm operatively engaged with said movable member, a spring providing a resiliently yieldable driving connection between said movable member and said deadlock means in a direction to shift said deadlock means toward such blocking position, and rigid abutment means on said deadlock means engageable by said movable member to withdraw said deadblock means from such blocking position.

5. In a device of the class described, a roll-back latch bolt mounted for pivotal movement between projected and retracted positions, an auxiliary bolt mounted adjacent said roll-back bolt for movement between projected and retracted position, means resiliently urging said auxiliary bolt toward projected position, deadlock means mounted for movement into and out of a position blocking said roll-back bolt against retraction and comprising a slide, provided with a first abutment and a second abutment spaced from said first abutment, and means providing an operative connection between said auxiliary bolt and said deadlock means and effective, when said auxiliary bolt is in retracted position, to urge said deadlock means toward such blocking position, and, when said auxiliary bolt is projected, to withdraw said deadlock means from such blocking position, comprising a member mounted for reciprocation and located at that side of said deadlock slide remote from said auxiliary bolt, a lever mounted upon a pivotal axis intermediate said auxiliary bolt and said member and having a first arm operatively engaged with said auxiliary bolt and a second arm operatively engaged with said member, resiliently yieldable means interposed between one face of said member and one of said slide abutments to transmit resilient force unidirectionally from said member to said slide in a direction toward such blocking position, an opposite face of said member being positioned for engagement with the other of said slide abutments to transmit force positively and unidirectionally to said slide in a direction away from such blocking position.

6. The device of claim 5 including means independent of said auxiliary latch for withdrawing said deadlock slide from such blocking position.

7. The device of claim 6 in which said independent means is constructed and arranged for engagement with said other slide abutment.

8. The device of claim 7 including means providing a lost-motion connection between said slide and said roll-back latch bolt effective to retract said roll-back bolt positively upon continued unidirectional movement of said slide after withdrawal from such blocking position.

9. The device of claim 1 in which that face of said auxiliary latch bolt which is presented in a door-closing direction constitutes a cam surface cooperative with a strike plate to move said auxiliary bolt to retracted position when said door closes.

10. In a device of the class described, a roll-back latch bolt mounted for pivotal movement between projected and retracted positions, an auxiliary bolt mounted adjacent said roll-back bolt for movement between projected and retracted positions, means resiliently urging said auxiliary bolt toward projected position, deadlock means mounted for movement into and out of a position blocking said roll-back bolt against retraction, a movable member mounted at that side of said deadlock means remote from said auxiliary bolt, a lever pivotally mounted intermediate said auxiliary bolt and said movable member and having a first arm operatively engaged with said auxiliary bolt and a second arm operatively engaged with said movable member, resilient means interposed between said movable member and said deadlock means for yieldably transmitting force from said movable member to said deadlock means to urge said deadlock means toward such blocking position, abutment means on said deadlock means engageable by said movable member in a direction to withdraw said deadlock means from such blocking position, and an element mounted for oscillation about a fixed axis, said element being constructed and arranged for driving engagement with said deadlock means to withdraw the same from such blocking position upon oscillation of said element in one direction to a predetermined degree.

11. The device of claim 10 including means providing a lost-motion connection between said deadlock means and said roll-back latch bolt effective to retract said roll-back bolt positively upon continued movement of said element in said one direction beyond such predetermined degree.

12. In combination, a swinging door formed with a cavity opening through a movable edge thereof, a latch assembly seated in said cavity, said latch assembly comprising a roll-back latch bolt mounted for pivotal movement between projected and retracted positions, an auxiliary bolt mounted adjacent said roll-back bolt for movement between projected and retracted positions, means resiliently urging said auxiliary bolt toward projected position, deadlock means mounted for movement into and out of a position blocking said roll-back bolt against retraction, a movable member mounted at that side of said deadlock means remote from said auxiliary bolt, a lever pivotally mounted intermediate said auxiliary bolt and said movable member and having a first arm operatively engaged with said auxiliary bolt and a second arm operatively engaged with said movable member, resilient means interposed between said movable member and said deadlock means for yieldably transmitting force from said movable member to said deadlock means to urge said deadlock means toward such blocking position, abutment means on said deadlock means engageable by said movable member in a direction to withdraw said deadlock means from such blocking position, and an element mounted for oscillation about a fixed axis, said element being constructed and arranged for driving engagement with said deadlock means to withdraw the same from such blocking position upon oscillation of said element in one direction to a predetermined degree, said bolts being positioned for projection significantly beyond said door edge, a panic bar assembly mounted on the inner surface of said door, said panic bar assembly comprising a case, a panic bar supporting lever pivotally supported from said case and having a finger disposed within said case, a latch control slide reciprocably mounted within said case and resiliently biased toward one end of its stroke, said finger operatively engaging said slide to move the same against its bias upon actuation of said lever, a back plate fixedly mounted in said case to enclose said slide, said plate being formed with an aperture therethrough, a hollow cam journalled in and penetrating said aperture, said cam having, adjacent its inner end, a laterally-projecting lever drivingly engaged by said latch control slide whereby slide reciprocation produces oscillation of said cam, and a spindle, one end of said spindle having a driving connection with said cam and the other end of said spindle having a driving connection with said element, whereby panic bar actuation will withdraw said deadlock means from such blocking position.

13. The combination of claim 12 in which the outer end of said spindle is formed to provide a socket of polygonal cross section, said element being substantially coaxial with said cam and being formed with an axial socket of polygonal cross section facing said cam socket, and said spindle has one polygonal end pivotally secured in said cam socket, the other end of said spindle being polygonal and being loosely but drivingly received in said element socket.

14. The combination of claim 12 including a barrel-type lock assembly including a rotatable barrel and seated in the outer surface of said door, said back plate being formed with a further aperture therethrough, further cam means journalled in and penetrating said further aperture, said further cam means having, adjacent its inner end, an actuator finger and being formed at its outer end with a polygonal socket, and a further spindle having one end secured to move with said lock barrel and having its opposite end drivingly seated in said socket of said further cam means.

15. The combination of claim 12 including a barrel-type lock assembly including a rotatable barrel and seated in the outer surface of said door, said back plate being formed with a further aperture therethrough, further cam means journalled in and penetrating said further aperture, said further cam means having, adjacent its inner end, an actuator finger positioned for cooperative engagement with said latch control slide to shift the same against its bias, said further cam means being formed at its outer end with a polygonal socket, and a further spindle having one end secured to move with said lock barrel and having its opposite end drivingly seated in said socket of said further cam means.

16. The combination of claim 12 including manipulable means mounted on the outer surface of said door, and a shiftable element supported from the inner surface of said back plate and disposed for operative engagement with said latch control slide, said manipulable means extending into driving engagement with said shiftable element to actuate the same to withdraw said deadlock means from such blocking position.

17. The combination of claim 12 including manipulable means mounted on the outer surface of said door, a shiftable element supported from the inner surface of said back plate and disposed for operative engagement with said latch control slide, said manipulable means extending into driving engagement with said shiftable element to actuate the same to withdraw said deadlock means from such blocking position, blocker means mounted on the inner surface of said back plate and movable into and out of the restraining association with said shiftable element, a barrel-type lock assembly including a rotatable barrel and seated in the outer surface of said door, said back plate being formed with a further aperture therethrough, further cam means journalled in and penetrating said further aperture, said further cam means having, adjacent its inner end, an actuator finger engageable with said blocker means to move the same, said further cam means being formed at its outer end with a polygonal socket, and a further spindle having one end secured to move with said lock barrel and having its opposite end drivingly seated in said socket of said further cam means.

18. The combination of claim 12 including a door knob oscillably mounted on the outer surface of said door, said back plate being formed with a second aperture therethrough, a second cam journalled in and penetrating said second aperture, said second cam being formed with oppositely-projecting arms alternatively engageable, upon rocking movement of said second cam in opposite directions, with said slide to shift the same against its bias, said second cam being formed with a polygonal socket in its outer end, and spindle means providing an operative connection between said door knob and said second cam.

19. The combination of claim 12 including a door knob oscillably mounted on the outer surface of said door, said back plate being formed with a second aperture therethrough, a second jam journalled in and penetrating said second aperture, said second cam being formed with oppositely-projecting arms alternatively engageable, upon rocking movement of said second cam in opposite directions, with said slide to shift the same against its bias, said second cam being formed with a polygonal socket in its outer end, spindle means providing an operative connection between said door knob and said second cam, a barrel-type lock assembly including a rotatable barrel and seated in the outer surface of said door, said back plate being formed with a further aperture therethrough, further cam means journalled in and penetrating said further aperture, said further cam means having, adjacent its inner end, an actuator finger and being formed at its outer end with a polygonal socket, a further spindle having one end secured to move with said lock barrel and having its opposite end drivingly seated in said socket of said further cam means, and blocker means mounted on the inner surface of said back plate and movable into and out of restraining association with said second cam, said actuator finger of said further cam being positioned for driving engagement with said blocker means to move the same.

20. The combination of claim 12 including a lever pivotally mounted on said door and having a thumb piece accessible for manipulation from the outer side of said door, and a lift plate reciprocably supported on the inner surface of said back plate and positioned to engage said latch control slide to shift the same against its bias, said lever having an arm extending into engagement with said lift plate to actuate the same upon manipulation of said thumb piece.

21. The combination of claim 12 including a lever pivotally mounted on said door and having a thumb piece accessible for manipulation from the outer side of said door, a lift plate reciprocably supported on the inner surface of said back plate and positioned to engage said latch control slide to shift the same against its bias, said lever having an arm extending into engagement with said lift plate to actuate the same upon manipulation of said thumb piece, a barrel-type lock assembly including a rotatable barrel and seated in the outer surface of said door, said back plate being formed with a further aperture therethrough, further cam means journalled in and penetrating said further aperture, said further cam means having, adjacent its inner end, an actuator finger and being formed at its outer end with a polygonal socket, a further spindle having one end secured to move with said lock barrel and having its opposite end drivingly seated in said socket of said further cam means, and blocker means supported on the inner surface of said back plate and movable into and out of position to restrain said lift plate against latch control slide shifting actuation, said actuator finger of said further cam means being operatively engageable with said blocker means to move the same.

22. The combination of claim 12 including a lever pivotally mounted on said door and having a thumb piece accessible for manipulation from the outer side of said door, a lift plate reciprocably supported on the inner surface of said back plate and positioned to engage said latch control slide to shift the same against its bias, said lever having an arm extending into engagement with said lift plate to actuate the same upon manipulation of said thumb piece, a barrel-type lock assembly including a rotatable barrel and seated in the outer surface of said door, said back plate being formed with a further aperture therethrough, further cam means journalled in and penetrating said further aperture, said further cam means having, adjacent its inner end, an actuator finger and being formed at its outer end with a polygonal socket, a further spindle having one end secured to move with said lock barrel and having its opposite end drivingly seated in said socket of said further cam means, a blocker cam oscillably supported on the inner surface of said back plate and movable into and out of position to restrain said lift plate against latch control slide shifting actuation, and a blocker slide reciprocably supported on the inner surface of said back plate and operatively engaging said blocker cam to oscillate the same upon reciprocation of said blocker slide, said actuator finger of said further cam means being operatively engageable with said blocker slide to reciprocate the same.

References Cited in the file of this patent
UNITED STATES PATENTS

| | | |
|---|---|---|
| 1,203,116 | Hurd | Oct. 31, 1916 |
| 1,252,454 | Le Beau | Jan. 8, 1918 |
| 1,593,852 | Shaw | July 27, 1926 |
| 1,677,271 | Carroll | July 17, 1928 |
| 2,107,299 | Kilpatrick | Feb. 8, 1938 |
| 2,147,581 | Prinzler | Feb. 14, 1939 |
| 2,212,316 | Edwards | Aug. 20, 1940 |
| 2,505,190 | Kulbersh | Apr. 25, 1950 |
| 2,724,606 | Wartian | Nov. 22, 1955 |
| 2,911,249 | Jewett et al. | Nov. 3, 1959 |